United States Patent
Rieder et al.

(10) Patent No.: US 9,097,570 B2
(45) Date of Patent: Aug. 4, 2015

(54) MEASURING TRANSDUCER OF A VIBRATION-TYPE HAVING SLITS IN THE COUPLING ELEMENTS FOR TUNING EIGENFREQUENCY OF THE MEASURING TUBES

(71) Applicant: Endress + Hauser Flowtec AG, Reinach (CH)

(72) Inventors: Alfred Rieder, Landshut (DE); Hao Zhu, Freising (DE); Ennio Bitto, Aesch (CH); Gerhard Eckert, Grenzach-Wyhlen (DE)

(73) Assignee: Endress + Hauser Flowtec AG, Reinach (CH)

( * ) Notice: Subject to any disclaimer, the term of this patent is extended or adjusted under 35 U.S.C. 154(b) by 155 days.

(21) Appl. No.: 13/855,145

(22) Filed: Apr. 2, 2013

(65) Prior Publication Data

US 2013/0291652 A1    Nov. 7, 2013

(30) Foreign Application Priority Data

Apr. 3, 2012  (WO) ................. PCT/EP2012/056102
Apr. 4, 2012  (DE) ......................... 10 2012 102 947
Jul. 30, 2012 (DE) ......................... 10 2012 106 930

(51) Int. Cl.
*G01F 1/84*    (2006.01)

(52) U.S. Cl.
CPC ................ *G01F 1/84* (2013.01); *G01F 1/8404* (2013.01); *G01F 1/8413* (2013.01); *G01F 1/8477* (2013.01)

(58) Field of Classification Search
None
See application file for complete search history.

(56) References Cited

U.S. PATENT DOCUMENTS

| 4,781,069 A | 11/1988 | Mitzner |
| 5,370,002 A | 12/1994 | Normen |
| 6,415,668 B1 | 7/2002 | Cage |
| 2012/0255369 A1 | 10/2012 | Rieder |

FOREIGN PATENT DOCUMENTS

| DE | 102009055069 A1 | 6/2011 |
| DE | 102011006971 A1 | 10/2012 |
| JP | 2009180699 A | 8/2009 |
| WO | 2012136671 A1 | 10/2012 |

OTHER PUBLICATIONS

International Search Report, EPO, The Netherlands, May 27, 2013.

*Primary Examiner* — Harshad R Patel
(74) *Attorney, Agent, or Firm* — Bacon & Thomas, PLLC

(57) ABSTRACT

A measuring transducer serves for producing vibration signals corresponding to parameters of a flowing medium comprises a measuring transducer housing having housing ends and, extending within the measuring transducer housing between its housing ends, a tube arrangement formed by means of at least two tubes. Of the two tubes, at least one tube serves as a measuring tube conveying flowing medium and the other tube is mechanically connected with the tube by means of a first coupling element to form an inlet-side coupling zone and by means of a second coupling element to form an outlet-side coupling zone. At least the first coupling element has in a region extending between the tubes a slit having at least one closed end. Slit has a maximal slit width and a maximal slit length, which is greater than the maximal slit width. Placed partially within the slit is a connecting element, which contacts a slit edge enclosing said slit.

45 Claims, 6 Drawing Sheets

MEASURING TRANSDUCER OF A VIBRATION-TYPE HAVING SLITS IN THE COUPLING ELEMENTS FOR TUNING EIGENFREQUENCY OF THE MEASURING TUBES

TECHNICAL FIELD

The invention relates to a measuring transducer of vibration-type as well as to a method for tuning at least one characteristic eigenfrequency of a tube arrangement, especially a tube arrangement serving as measuring tube of such a measuring transducer. Moreover, the invention relates also to a measuring system formed by means of such a measuring transducer of vibration-type.

BACKGROUND DISCUSSION

In industrial measurements technology, especially also in connection with the control and monitoring of automated manufacturing processes, for ascertaining characteristic measured variables of media, for example, of liquids and/or gases, flowing in a process line, for example, a pipeline, often such measuring systems are used, which, by means of a measuring transducer of vibration-type and a thereto connected, most often in a separate electronics-housing accommodated, transmitter electronics, induce in the flowing medium reaction forces, for example, Coriolis forces, and, derived from these, repetitively produce measured values correspondingly representing at least one measured variable, for example, a mass flow rate, a density, a viscosity or some other process parameter. Such measuring systems—often formed by means of an in-line measuring device in compact construction with integrated measuring transducer, such as, for instance, a Coriolis, mass flow meter,—have been known for quite some time and have proved themselves suitable for industrial applications. Examples of such measuring systems with a measuring transducer of vibration-type, or individual components thereof, are described e.g. in EP-A 763 720, EP-A 462 711, EP-A 421 812, EP-A 1 248 084, WO-A 98/40702, WO-A 96/08697, WO-A 2010/059157, WO-A 2008/059015, WO-A 2007/040468, WO-A 2005/050145, WO-A 2004/099735, U.S. Pat. No. 7,610,795, U.S. Pat. No. 7,562,585, U.S. Pat. No. 7,421,350, U.S. Pat. No. 7,392,709, U.S. Pat. No. 7,350,421, U.S. Pat. No. 7,325,461, U.S. Pat. No. 7,127,952, U.S. Pat. No. 6,883,387, U.S. Pat. No. 6,311,136, U.S. Pat. No. 6,092,429, U.S. Pat. No. 5,969,264, U.S. Pat. No. 5,926,096, U.S. Pat. No. 5,796,011, U.S. Pat. No. 5,734,112, U.S. Pat. No. 5,610,342, U.S. Pat. No. 5,602,345, U.S. Pat. No. 5,359,881, U.S. Pat. No. 5,050,439, U.S. Pat. No. 5,009,109, U.S. Pat. No. 4,879,911, U.S. Pat. No. 4,823,614, U.S. Pat. No. 4,801,897, U.S. Pat. No. 4,768,384, U.S. Pat. No. 4,738,144, U.S. Pat. No. 4,680,974, US-A 2006/0283264, US-A 2011/0265580, US-A 2011/0167907, US-A 2010/0251830, US-A 2010/0242623, US-A 2010/0050783, or the not yet published international patent application PCT/EP 2012/056102 of the assignee.

Measuring transducers disclosed therein comprise at least two, equally constructed, essentially straight or curved, e.g. U-, or V-shaped, measuring tubes accommodated in a measuring transducer housing and serving for conveying the medium, in given cases, an inhomogeneous, extremely hot or even very viscous medium. The at least two measuring tubes can, such as shown, for example, in the mentioned U.S. Pat. No. 5,734,112, U.S. Pat. No. 5,796,011 or US-A 2010/0242623, be inserted into the process line via a flow divider extending on the inlet side between the measuring tubes and an inlet-side, connecting flange as well as via a flow divider extending on the outlet side between the measuring tubes and an outlet-side, connecting flange to form a tube arrangement with flow paths connected in parallel with one another. The measuring tubes can, however, also, such as shown, for example, in the mentioned EP-A 421 812, EP-A 462 711, EP-A 763 720, be inserted into the process line via in- and outlet tube pieces to form a tube arrangement with a single traversing flow path. In measuring operation, the measuring tubes, then flowed through by the medium in parallel or serially, are caused to vibrate for the purpose of generating in the flowing medium oscillation forms influenced by the flowing medium.

Selected as excited oscillation form—the so-called wanted mode—is, in the case of measuring transducers with curved measuring tubes, usually that eigenoscillation form (eigenmode), in the case of which each of the measuring tubes moves at least partially at a natural resonant frequency (eigenfrequency) about an imaginary longitudinal axis of the measuring transducer as an end-clamped cantilever in a pendulum-like manner, whereby Coriolis forces are induced in the medium flowing through as a function of mass flow. These, in turn, lead to the fact that there are superimposed on the excited oscillations of the wanted mode, in the case of curved measuring tubes, thus pendulum-like, cantilever oscillations, thereto equal frequency, bending oscillations according to at least one likewise natural, second oscillation form of, in comparison to the wanted mode, higher (modal) order, the so-called Coriolis mode. In the case of measuring transducers with curved measuring tube, these cantilever oscillations in the Coriolis mode, forced by Coriolis forces, usually correspond to that eigenoscillation form, in the case of which the measuring tube also executes rotary oscillations about an imaginary vertical axis perpendicular to the longitudinal axis. In the case of measuring transducers with straight measuring tubes, in contrast, for the purpose of producing mass flow dependent, Coriolis forces, often a wanted mode is selected, in the case of which each of the measuring tubes executes, at least partially, bending oscillations essentially in a single imaginary plane of oscillation, so that the oscillations in the Coriolis mode are developed accordingly as bending oscillations of equal oscillation frequency and coplanar to the wanted mode oscillations.

For active exciting of oscillations of the at least two measuring tubes, measuring transducer of vibration-type have, additionally, an exciter mechanism driven during operation by an electrical driver signal, e.g. a controlled electrical current, generated and correspondingly conditioned by the mentioned transmitter electronics, respectively a therein correspondingly provided, special driver circuit. The exciter mechanism excites the measuring tubes to bending oscillations, especially opposite equal bending oscillations, in the wanted mode by means of at least one electro mechanical, especially electro dynamic, oscillation exciter flowed through during operation by the electrical current. The oscillation exciter acts practically directly, especially differentially, on the at least two measuring tubes. Furthermore, such measuring transducers include a sensor arrangement having oscillation sensors, especially electro dynamic, oscillation sensors, for the at least pointwise registering of inlet-side and outlet-side oscillations of at least one of the measuring tubes, especially opposite equal bending oscillations of the measuring tubes in the Coriolis mode, and for producing electrical sensor signals influenced by the process parameter (such as, for instance, the mass flow or the density) to be registered and serving as vibration signals of the measuring transducer. As described, for example, in U.S. Pat. No. 7,325,461, in the case of measuring transducers of the type being discussed, in given cases, the oscillation exciter can, at least at times, be used as oscillation sensor and/or an oscillation sensor at least at times as oscillation exciter. The exciter mechanism of measuring transducers of the type being discussed includes usually at least one electrodynamic oscillation exciter and/or an oscillation exciter acting differentially on the measuring tubes, while the sensor arrangement comprises an inlet-side, most often likewise electrodynamic, oscillation sensor, as well as at least one essentially equally-constructed, outlet-side, oscillation sensor. Such electrodynamic and/or differential, oscillation exciters of usually marketed measuring transducers of vibration-type are formed by means of a magnet coil affixed on one of the measuring tubes and flowed through, at least at times, by an electrical current—as well as by means of a rather elongated, especially rod-shaped, permanent magnet interacting with the at least one magnet coil, especially plunging into such, and serving as armature. The permanent magnet is correspondingly affixed on the other, opposite-equally moving, measuring tube. The permanent magnet and the magnet coil serving as exciter coil are, in such case, usually so oriented that they are essentially coaxial with one another. Additionally, in the case of conventional measuring transducers, the exciter mechanism is usually embodied in such a manner and so placed in the measuring transducer that it acts, in each case, essentially centrally on the measuring tubes. In such case, the oscillation exciter and, insofar, the exciter mechanism, such as, for example, also shown in the proposed measuring transducers, is affixed to the particular measuring tube externally at least pointwise along an imaginary central, peripheral line of such measuring tube. Alternatively to an exciter mechanism formed by means of an oscillation exciter acting centrally and directly on the respective measuring tube, it is also possible, such as provided, among other things, in U.S. Pat. No. 6,092,429 or U.S. Pat. No. 4,823,614, to use, for example, exciter mechanisms formed by means of two oscillation exciters each affixed not in the center of the respective measuring tube to the measuring tube, but, instead, at the in- and outlet sides.

In the case of most marketed measuring transducers of vibration-type, the oscillation sensors of the sensor arrangement are of essentially the same construction as the at least one oscillation exciter, at least insofar as they work according to the same principle. Accordingly, also the oscillation sensors of such a sensor arrangement are most often formed, in each case, by means of: at least one coil affixed on one of the measuring tubes, wherein the coil is, at least at times, passed through by a variable magnetic field and, associated therewith, at least at times supplied with an induced measurement voltage; as well as a permanently magnetic armature affixed to another of the measuring tubes and interacting with the at least one coil for delivering the magnetic field. Each of the aforementioned coils is additionally connected with the mentioned transmitter electronics of the in-line measuring device by means of at least one pair of electrical connecting lines, which most often are led on as short as possible paths from the coils to the measuring transducer housing. Due to the superpositioning of the wanted- and Coriolis modes, the oscillations of the vibrating measuring tubes registered by means of the sensor arrangement on the inlet side and on the outlet side have a measurable phase difference dependent on the mass flow. Usually, the measuring tubes of such measuring transducers, e.g. applied in Coriolis, mass flow meters, are excited during operation to an instantaneous natural resonant frequency of the oscillation form selected for the wanted mode, e.g. at oscillation amplitude controlled to be constant. Since this resonant frequency is dependent especially also on the instantaneous density of the medium, market-usual Coriolis, mass flow meters can measure, besides mass flow, supplementally also the density of flowing media. Furthermore, it is also possible, such as shown, for example, in U.S. Pat. No. 6,651,513 or U.S. Pat. No. 7,080,564, directly to measure by means of measuring transducers of vibration-type viscosity of the medium flowing through, for example, based on an exciter energy required for maintaining the oscillations, or by means of the excitation power and/or based on an attenuation of oscillations of the at least one measuring tube resulting from a dissipation of oscillatory energy, especially that in the aforementioned wanted mode. Moreover, also other measured variables derived from the aforementioned primary measured values, mass flow rate, density and viscosity, such as, for instance, according to U.S. Pat. No. 6,513,393, the Reynolds number, can be ascertained.

In the case of measuring transducers of the type being discussed, it is of special importance to trim the oscillation characteristics of individual measuring transducer components, not least of all also of the at least one measuring tube, consequently the parameters characterizing, or influencing, said oscillation characteristics, such as, for instance, tube shapes, or -cross sections, tube wall thicknesses and, associated therewith, mass distributions, bending stiffnesses, eigenfrequencies etc., of each individual measuring transducer, for example, as exactly as possible, to a respectively nominal target measure therefor, namely to a target measure predetermined for defined reference conditions, or respectively to hold the scattering of said parameters within a population of produced measuring transducers of the same type in an as narrow as possible tolerance range predetermined therefor. Equally important in the case of measuring transducers of the type being discussed is to prevent, or correspondingly to minimize, possible imbalances of the respective tube arrangement brought about, for instance, by non-uniform, consequently non-symmetric, mass and/or stiffness distributions within the tube arrangement.

In such case, it is, among other things, also of special interest, at an as "late" as possible production phase, to adjust the eigenfrequencies of the respective tube arrangement of the measuring transducer to the desired target measure, here thus to one or more selected target eigenfrequencies, or correspondingly to compensate possible imbalances, in order to be able reliably to avoid possible recent detuning of the tube arrangement in a following production phase of the measuring transducer.

In the initially mentioned U.S. Pat. No. 5,610,342, for example, a method for the dynamic adjusting of a tube serving as measuring tube of a measuring transducer of vibration-type to a target stiffness is disclosed, in the case of which method the tube is pressed at its two tube ends in, in each case, into a bore of a first, respectively second, endpiece of a support tube by targeted plastic deformation of the tube walls in the region of the pipe ends and, as a result of such, the entire tube arrangement is adjusted to a target eigenfrequency. Furthermore, in the initially mentioned U.S. Pat. No. 7,610,795, a method is described for tuning a tube serving as measuring tube of a measuring transducer of vibration-type to a target eigenfrequency, consequently to a target bending stiffness co-determined by the tube geometry and cross section, by means of a fluid introduced therein and supplied with an (over-) pressure introducing plastic deformation of at least one part of its tube wall.

A disadvantage in the case of the methods known from the state of the art is, among other things, that they are very complicated. Moreover, another disadvantage of the aforementioned methods is that, as a matter of the principles involved, they lead ultimately to a certain change of the geometry of the tubes, namely to a deviation from the ideal circular shape of the cross section, respectively to an increased deviation from the perfect uniformity of the cross section in the longitudinal direction, and, consequently, to a deviation of the contour of the lumen of the tube from the ideal form.

SUMMARY OF THE INVENTION

An object of the invention is, consequently, to provide a method, respectively a measuring transducer suitable for performing such a method, which enable a precise as well as simple adjustment of a tube arrangement formed by means of at least two tubes, and ultimately serving as inner part of measuring transducers of the initially defined type, to a target eigenfrequency even in a phase of the manufacturing process for such a tube arrangement, consequently also of measuring transducers of vibration-type, in which the particular tube arrangement is already produced, in given cases, even already equipped with oscillation exciter- and/or oscillation sensor components, this as much as possible while preventing any subsequent lasting deformation of even only one of the tubes of the tube arrangement. Furthermore, an object of the invention is also to provide a measuring transducer of vibration-type, in the case of which imbalances of the aforementioned type are, to begin with, largely avoided, respectively, in given cases, can be easily minimized, or compensated, even at a late phase of the production.

For achieving the object, the invention resides in a measuring transducer of vibration-type serving for producing vibration signals as a function of parameters of a flowing medium, for example, parameters such as a mass flow rate, a density and/or a viscosity, which measuring transducer comprises a measuring transducer housing having a first housing end and a second housing end as well as a tube arrangement extending within the measuring transducer housing from its first housing end to its second housing end, and formed by means of at least two tubes, for example, equally constructed tubes and/or tubes extending parallel to one another, of which at least a first tube, for example, a first tube vibrating during operation, is embodied as a measuring tube serving for conveying flowing medium, and of which a second tube, for example, a second tube vibrating during operation, is connected mechanically with the first tube to form an inlet-side, first coupling zone by means of a first coupling element, for example, a plate-shaped, first coupling element and to form an outlet-side, second coupling zone by means of a second coupling element, for example, a plate-shaped, second coupling element. The first coupling element has in a region extending between the first and second tubes a slit having at least one closed end, for example, a slit in the form of an elongated hole or a unilaterally open, straight, elongated slot, with a maximal slit width and a maximal slit length, which is greater than the maximal slit width, as well as, placed partially within the slit, for example, spaced from the closed end of the slit, a connecting element, for example, a connecting element formed by means of a screw and at least one nut applied thereto and/or a releasable connecting element and/or a rigid connecting element, which contacts a slit edge enclosing said slit, especially in such a manner that the connecting element mechanically couples with one another mutually opposing edge regions of the slit edges and/or edge regions spaced from the closed end, in order to form a securement zone, within which relative movements of said edge regions are prevented, in that the connecting element is affixed to said edge regions lying opposite one another.

Furthermore, the invention resides in a measuring system formed by means of such a measuring transducer and serving for measuring a medium flowing from a pipeline, for example, an aqueous liquid, a slurry, a paste or some other flowable material, which measuring system, for example, a measuring system embodied as a compact measuring device and/or as a Coriolis, mass flow, measuring device, further comprises a transmitter electronics electrically coupled with the measuring transducer (through which medium flows during operation) for activating the measuring transducer and for evaluating vibration signals delivered by the measuring transducer.

Moreover, the invention resides also in a method for tuning at least one eigenfrequency characteristic for a tube arrangement formed by means of at least two tubes, for example, tubes of metal and/or tubes serving as measuring tubes of a measuring transducer of vibration-type of the invention, for example, for changing an interim eigenfrequency only interimly characteristic for said tube arrangement and/or for tuning said interim eigenfrequency to a target eigenfrequency deviating therefrom, of which at least two tubes at least a first tube, for example, a first tube vibrating during operation, is embodied as a measuring tube serving for conveying flowing medium, and of which at least two tubes a second tube, for example, a second tube vibrating during operation, is connected mechanically with the first tube by means of a first coupling element, for example, a plate-shaped, first coupling element, to form an inlet-side, first coupling zone and by means of a second coupling element, for example, a plate-shaped, second coupling element, to form an outlet-side, second coupling zone, in the case of which measuring transducer the first coupling element, especially for tuning at least one eigenfrequency characteristic to the tube arrangement, has in a region extending between the first and second tubes at least one slit having a closed end, for example, a slit in the form of an elongated hole or in the form of an unilaterally open, straight, elongated slot, with a maximal slit width and a maximal slit length, which is greater than the maximal slit width. In the case of the method of the invention, there is placed partially within the slit, a connecting element, for example, a connecting element formed by means of a screw and at least one nut screwed thereon and/or initially shiftable within the slit, affixed in such a manner that said connecting element, for example, spaced from the closed end of the slit, is contacted to a slit edge enclosing the slit, and that said connecting element mechanically couples edge regions of the slit edges lying opposite one another, for example, rigidly with one another, for example, by clamping the edge regions in the connecting element, in order to form a securement zone, within which relative movements of said edge regions are prevented.

According to a first embodiment of the measuring transducer the invention, it is, furthermore, provided that edge regions of the slit edges of the slit lying opposite one another and spaced from the at least one closed end of the slit are mechanically coupled with one another, for example, rigidly, by means of the connecting element, in order to form a securement zone of the first coupling element, within which relative movements of said edge regions are prevented. This embodiment of the invention provides, furthermore, that the securement zone is formed by affixing the connecting element, for example, releasably, on mutually opposing edge regions of the slit edges.

According to a second embodiment of the measuring transducer of the invention, it is, furthermore, provided that the securement zone is formed by clamping the mutually opposing edge regions of the slit edges in the connecting element.

According to a third embodiment of the measuring transducer of the invention, it is, furthermore, provided that the first coupling element is arranged equally far from the first housing end of the measuring transducer housing as the second coupling element is from the second housing end of the measuring transducer housing.

According to a fourth embodiment of the measuring transducer of the invention, it is, furthermore, provided that the first tube extends parallel to the second tube and/or that the first tube and the second tube are of equal construction as regards shape and material.

According to a fifth embodiment of the measuring transducer of the invention, it is, furthermore, provided that each of the tubes is curved, for example, with U- or V-shape.

According to a sixth embodiment of the measuring transducer of the invention, it is, furthermore, provided that each of the tubes is straight.

According to a seventh embodiment of the measuring transducer of the invention, it is, furthermore, provided that also the second tube is embodied as a measuring tube serving for conveying flowing medium.

According to an eighth embodiment of the measuring transducer of the invention, it is, furthermore, provided that the second coupling element has in a region extending between the first and second tubes a slit having at least one closed end, for example, a slit in the form of an elongated hole or a unilaterally open, straight, elongated slot and/or identical to the slit of the first coupling element, as well as, placed partially within the slit, for example, spaced from the closed end of the slit, a connecting element, for example, a connecting element formed by means of a screw and at least one nut applied thereto and/or a releasable connecting element and/or a connecting element constructed equally to the connecting element of the first coupling element, which contacts a slit edge enclosing said slit, for example, in such a manner that the connecting element mechanically couples with one another, for example, rigidly, mutually opposing edge regions of the slit edges, in order to form a securement zone, within which relative movements of said edge regions are prevented.

According to a ninth embodiment of the measuring transducer of the invention, it is, furthermore, provided that the connecting element comprises at least one screw placed partially in the slit, for example, a screw in the form of a cap screw or a stud bolt, with a screw shaft having an external thread as well as at least one nut, for example, nuts contacting each of the two edge regions of the slit and/or self-securing nuts, having an internal thread engaged with said external thread. Developing this embodiment of the invention further, it is, furthermore, provided that the securement zone is formed by clamping the mutually opposing edge regions of the slit edges in the connecting element, wherein the screw of the connecting element, for example, a screw embodied as a toothed flange bolt, has on one end of the screw shaft a screw head, and wherein each of the oppositely lying edge regions of the slit edges within the securement zone is clamped, in each case, between screw head and nut, in given cases, with interpositioning of an intermediate ply in the form of at least one washer contacting the edge regions. Alternatively or in supplementation, the connecting element can include a second nut, for example, a second nut contacting each of the two edge regions of the slit, and having an internal thread engaged with the external thread, and the securement zone can thereby be formed in that the mutually opposing edge regions of the slit edges are clamped in the connecting element, namely, in each case, between the two nuts, in given cases, with interpositioning of an intermediate ply in the form of at least one washer contacting the edge regions. The at least one nut of the connecting element can, for example, in each case, also be embodied as a toothed nut or also as a locking nut and/or be secured by means of at least one counter nut.

According to a first further development of the measuring transducer of the invention, such further comprises an electromechanical exciter mechanism mechanically coupled with the tube arrangement, for example, mounted on the first and second tubes, for effecting vibrations, for example, opposite equal bending oscillations, of the at least two tubes, for example, in such a manner that the first tube executes, at least partially, bending oscillations about a first imaginary bending oscillation axis of the tube arrangement and the second tube, at least partially, bending oscillations about a second imaginary bending oscillation axis of the tube arrangement parallel to the first imaginary bending oscillation axis.

According to a second further development of the measuring transducer of the invention, such further comprises a sensor arrangement for registering vibrations, for example, bending oscillations, of at least one of the tubes and for producing at least one vibration signal representing said vibrations.

According to a third further development of the measuring transducer of the invention, such further comprises an inlet-side, first flow divider having at least two flow openings spaced from one another, as well as an outlet-side, second flow divider having at least two flow openings spaced from one another. Furthermore, in such case, the at least two tubes are connected with the flow dividers, for example, equally-constructed flow dividers, to form a tube arrangement with at least two flow paths, along which flow can occur in parallel, namely in such a manner that the first tube opens with an inlet-side, first tube end into a first flow opening of the first flow divider and with an outlet-side, second tube end into a first flow opening of the second flow divider and that the second tube opens with an inlet-side, first tube end into a second flow opening of the first flow divider and with an outlet-side, second tube end into a second flow opening of the second flow divider. In such case, for example, also the first housing end of the measuring transducer housing can be formed by means of a first flow divider and the second housing end of the measuring transducer housing can be formed by means of a second flow divider, wherein the first housing end of the measuring transducer housing is formed by means of a first flow divider and the second housing end of the measuring transducer housing by means of a second flow divider.

According to an embodiment of the method of the invention, the connecting element comprises at least one screw placed partially in the slit and embodied, for example, as a cap screw or a stud bolt, with a screw shaft having an external thread, as well as at least one nut, for example, a nut contacting each of the two edge regions of the slit and/or a releasable nut, having an internal thread engaged with said external thread, in the case of which method, for affixing the connecting element, said screw and the at least one nut are turned relative to one another about an imaginary screw axis. Developing this embodiment of the invention further, it is additionally provided that the screw of the connecting element has a screw head on an end of the screw shaft, and that, for forming the securement zone, each of the oppositely lying edge regions of the slit edges within the securement zone is, in each case, clamped between screw head and nut. Alternatively thereto or in supplementation thereof, the connecting element can be formed by means of at least two nuts, of which each has an internal thread for engagement with the external thread of the screw shaft, and, for forming the securement zone, each of the oppositely lying edge regions of the slit edges within the securement zone can, in each case, be clamped between both nuts.

According to a first further development of the method of the invention, such further comprises a step of the ascertaining an interim eigenfrequency of the tube arrangement, namely an eigenfrequency differing from an eigenfrequency predetermined for the tube arrangement, respectively a target eigenfrequency to be tuned to, for example, a mechanical instantaneous eigenfrequency of the tube arrangement measured after affixing the connecting element and/or based on at least one tube allowed to vibrate.

According to a second further development of the method of the invention, such further comprises a step of ascertaining, for example, based on at least one measured mechanical instantaneous eigenfrequency of the tube arrangement in the case of tube allowed to vibrate, to what extent the interim eigenfrequency of the tube arrangement deviates from the eigenfrequency predetermined for the tube arrangement, or the target eigenfrequency to be tuned to.

According to a third further development of the method of the invention, such further comprises a step of positioning the connecting element in a region of the slit suitable for forming a securement zone establishing the target eigenfrequency.

According to a fourth further development of the method of the invention, such further comprises a step of releasing the connecting element in such a manner that said connecting element is thereafter movable relative to the slit.

According to a fifth further development of the method of the invention, such further comprises a step of testing whether the tube arrangement is trimmed to a target eigenfrequency predetermined therefor, for example, based on at least one instantaneous mechanical eigenfrequency of the tube arrangement measured in the case of a tube allowed to vibrate.

According to a sixth further development of the method of the invention, such further comprises a step of letting at least one of the tubes vibrate for ascertaining the interim eigenfrequency.

A basic idea of the invention is to trim one or more eigenfrequencies of a tube arrangement, especially a tube arrangement serving as a component of a measuring transducer of vibration-type, very simply, equally as well very effectively, to a corresponding, namely desired, target measure therefor, consequently a particular target eigenfrequency, by forming by means of a slit provided within a coupling element and a connecting element placed in the slit a securement zone co-determining a bending stiffness of the coupling element and by, once the coupling element has been mounted to the respective tubes, so selecting a final position of the connecting element —, first of all, displaceable within the slit —, consequently so selecting a position of the securement zone that, as a result, a bending stiffness of the coupling element, consequently a (total-)bending stiffness of the tube arrangement, as well as the therefrom co-determined eigenfrequencies of the tube arrangement are adjusted corresponding to the desired target measures. An advantage the invention is, among other things, that eigenfrequencies of the so formed tube arrangement can be brought, even at a comparatively "late" production phase, very precisely to the desired target measure, when a subsequent undefined detuning of the tube arrangement, consequently of the measuring transducer, is less likely.

The invention as well as other advantageous embodiments and utilities thereof will now be explained in greater detail based on examples of embodiments, which are presented in the figures of the drawing. Equal parts are provided in all figures with equal reference characters; when perspicuity requires or it otherwise appears sensible, already mentioned reference characters are omitted in subsequent figures. Other advantageous embodiments or further developments, especially also combinations, first of all, of only individually explained aspects of the invention, will become evident, furthermore, from the figures of the drawing, as well as also from the dependent claims per se.

DETAILED DISCUSSION IN CONJUNCTION
WITH THE DRAWINGS

Figure 1:
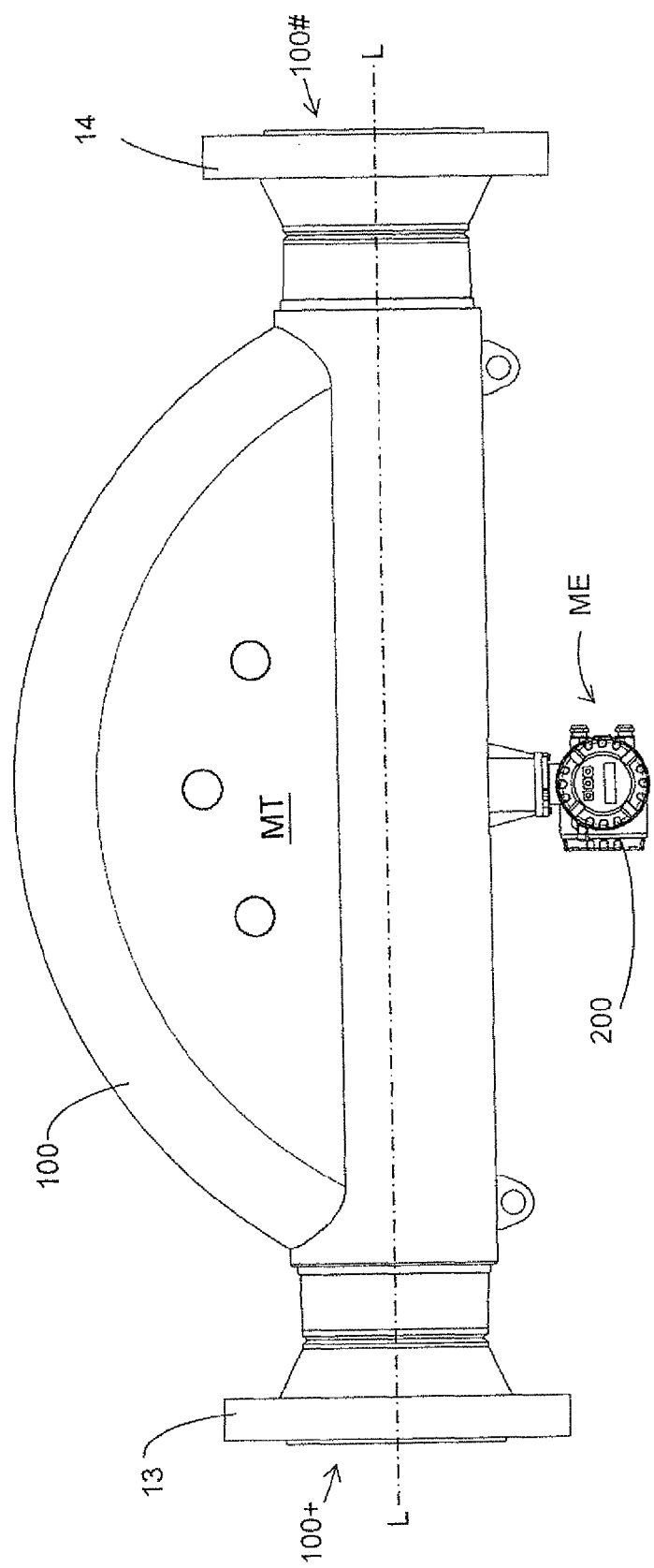
FIG. 1 is a side view of the measuring system of the invention.
Figure 2A:
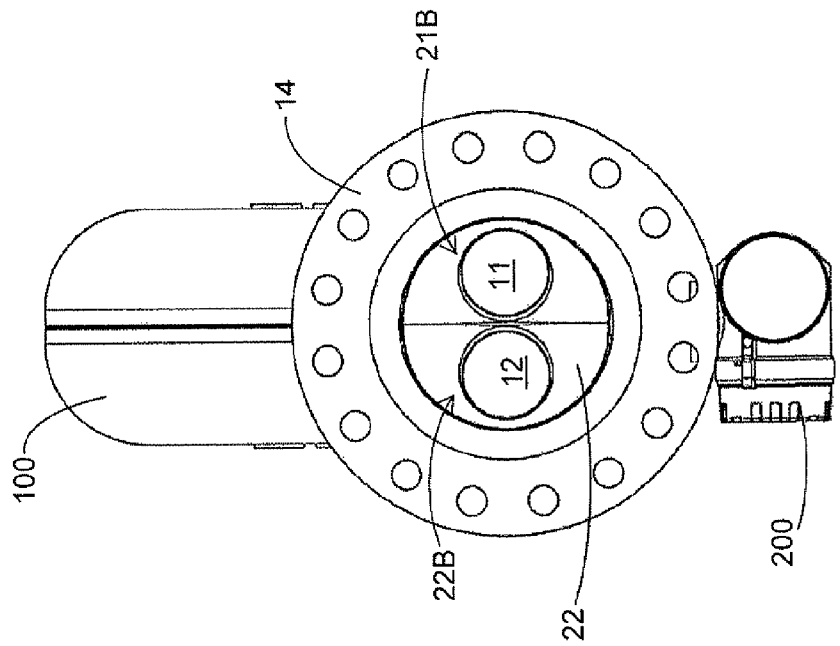
FIG. 2a and FIG. 2b are different side views, of the measuring system embodied as a compact measuring device for media flowing in pipelines.
Figure 2B:
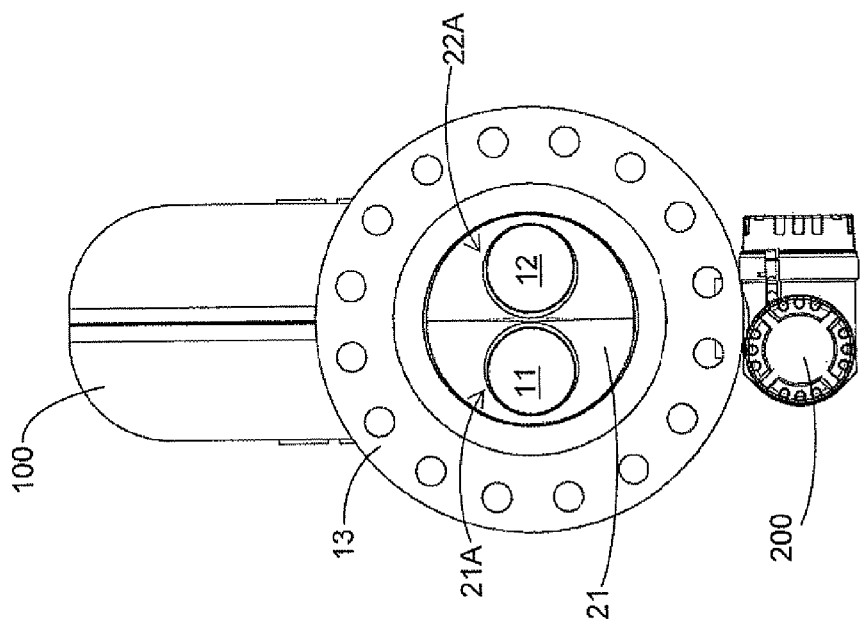

FIGS. 1, 2a and 2b show schematically an example of an embodiment of a measuring system insertable into a process line (not shown), for instance, a pipeline of an industrial plant. The measuring system can be embodied, for example, in the form of a Coriolis, mass flow measuring device, density measuring device, viscosity measuring device or the like for measuring and/or monitoring flowable media, especially fluid media, and serves, especially, for measuring and/or monitoring at least one physical parameter of the medium, such as, for instance, a mass flow rate, a density, a viscosity or the like. The measuring system—here implemented as an in-line measuring device in compact construction—comprises therefor a measuring transducer MT connected to the process line via an inlet end 100+ as well as an outlet end 100# and serving for registering the at least one parameter and providing measurement signals representative thereof. During operation, the medium to be measured, such as, for instance, a low viscosity liquid and/or a high viscosity paste, flows through the measuring transducer and the measuring transducer is electrically coupled with a transmitter electronics ME of the measuring system serving for activating the measuring transducer and for evaluating measurement signals delivered by the measuring transducer.

Figure 3:
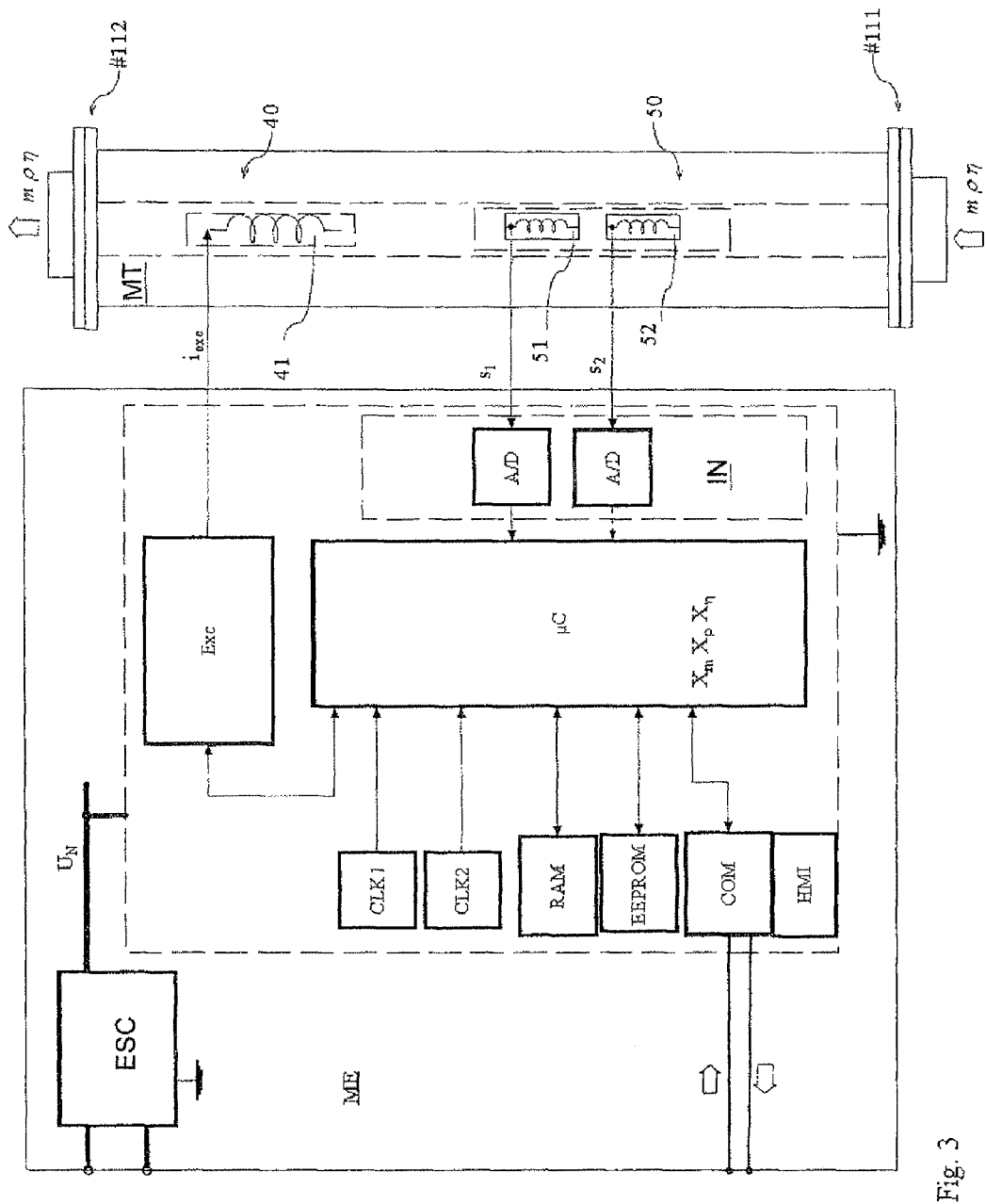
FIG. 3 is a schematic in the manner of a block diagram, a transmitter electronics with measuring transducer of vibration-type connected thereto, especially a transmitter electronics suitable for a measuring system according to FIGS. 1 and 2.

The transmitter electronics, especially a transmitter electronics supplied with electrical energy during operation from the exterior via connecting cable and/or internally by means of energy storer, includes, such as presented in FIG. 3 schematically in the manner of a block diagram, a driver circuit Exc serving for activating the measuring transducer, for example, a measuring transducer in the form of a measuring transducer of vibration-type, as well as a measuring- and evaluating circuit µC of the measuring system, which processes measurement signals of the measuring transducer MT. The measuring- and evaluating circuit µC is formed, for example, by means of a microcomputer and/or communicates during operation with the driver circuit Exc. During operation, the measuring- and evaluating circuit µC delivers measured values representing the at least one measured variable, such as e.g. the instantaneous, or a totaled, mass flow. The driver circuit Exc and the evaluating circuit µC as well as other electronic components of the transmitter electronics serving the operation of the measuring system, such as, for instance, internal energy supply circuits ESC for providing internal supply voltages $U_N$ and/or for connecting to a superordinated measurement data processing system and/or communication circuits COM for connecting to a fieldbus, are, furthermore, accommodated in a corresponding electronics housing 200, especially in an impact- and/or also explosion-resistant and/or hermetically sealed electronics housing 200. The electronics housing 200 of the in-line measuring device can be held, for example, directly on the measuring transducer housing 100 to form a measuring device of compact construction. For visualizing measuring system internally produced, measured values and/or, in given cases, measuring system, internally generated status reports, such as, for instance, an error report or an alarm, on-site, the measuring system can, furthermore, have a display- and interaction element HMI communicating at least at times with the transmitter electronics, such as, for instance, an LCD-, OLED- or TFT-display placed in the electronics housing behind a window correspondingly provided therein as well as a corresponding input keypad and/or a screen with touch input. In advantageous manner, the transmitter electronics ME, especially a programmable and/or remotely parameterable, transmitter electronics ME, can, furthermore, be so designed that it can, during operation of the in-line measuring device, exchange measuring- and/or other operating data, such as, for instance, current measured values or tuning- and/or diagnostic values serving for control of the in-line measuring device, with a superordinated electronic data processing system, for example, a programmable logic controller (PLC), a personal computer and/or a work station, via a data transmission system, for example, a fieldbus system and/or wirelessly per radio. In such case, the transmitter electronics ME can include, for example, an internal energy supply circuit ESC, which is fed during operation via the aforementioned fieldbus system from an external energy supply provided in the data processing system. In an embodiment of the invention, the transmitter electronics is, furthermore, so embodied that it is electrically connectable by means of a two-wire connection 2L, for example, configured as a 4-20 mA electrical current loop, with the external electronic data processing system and can thereby be supplied with electrical energy as well as transmit measured values to the data processing system. For the case, in which the measuring system is provided for coupling to a fieldbus or other communication system, the transmitter electronics ME can have a corresponding communication interface COM for a data communication according to one of the relevant industry standards. The electrical connecting of the measuring transducer to the mentioned transmitter electronics can occur by means of corresponding connecting lines, which are led out from the electronics housing 200, for example, via an electrical cable guide and can extend at least sectionally within the measuring transducer housing. The connecting lines can be embodied, in such case, at least partially, as electrical line wires encased at least sectionally in an electrical insulation, e.g. in the form of "twisted-pair" lines, flat ribbon cables and/or coaxial cables. Alternatively thereto or in supplementation thereof, the connecting lines can at least sectionally also be formed by means of conductive traces on a circuit board, especially a flexible circuit board, in given cases, a lacquered circuit board; compare, in this connection, also the initially mentioned U.S. Pat. No. 6,711,958 or U.S. Pat. No. 5,349,872.

Figure 4:
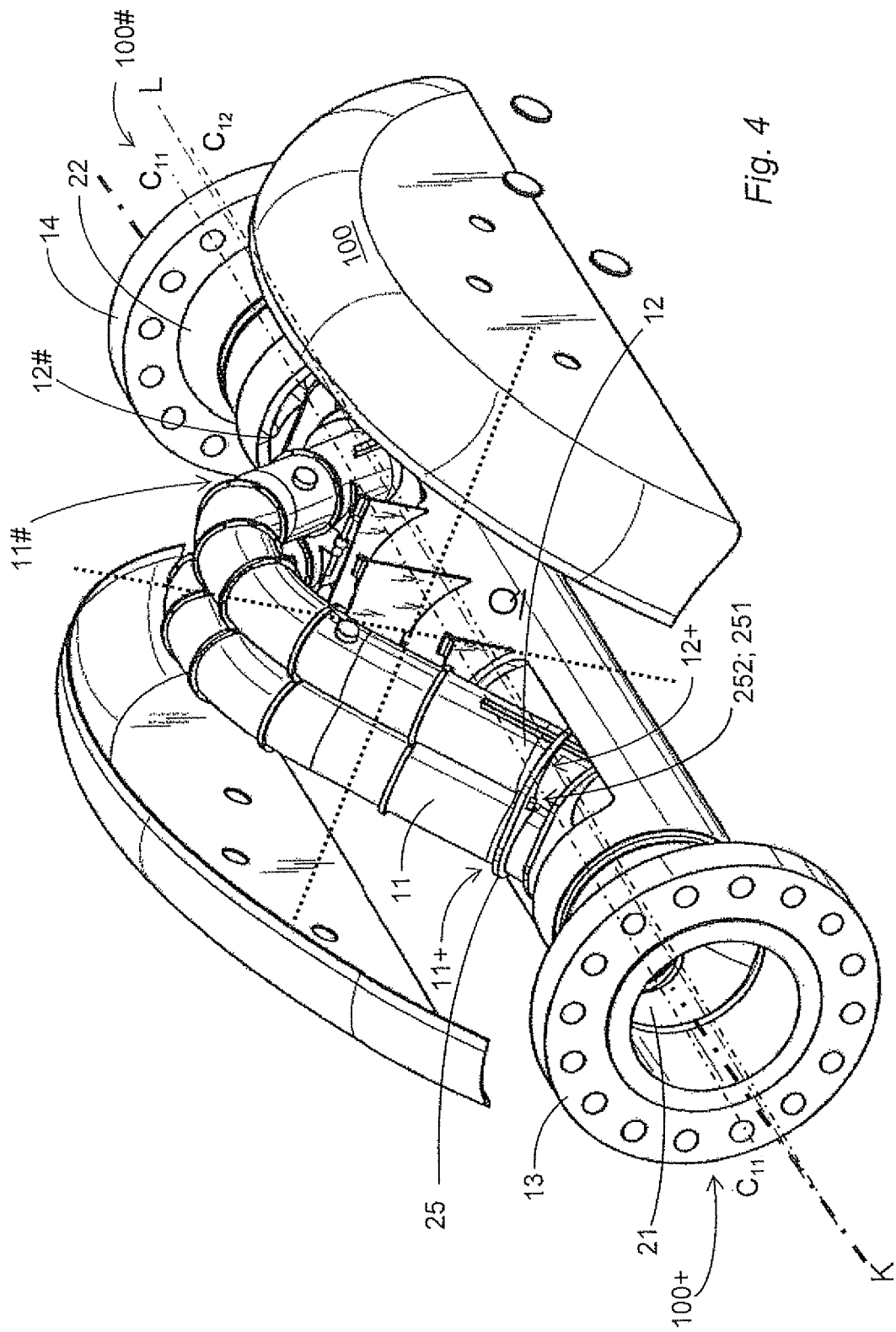
FIG. 4 and FIG. 5 are partially sectioned, respectively perspective, views, a measuring transducer of vibration-type with a tube arrangement formed by means of two tubes, especially a measuring transducer suitable for a measuring system according to FIG. 1 and FIG. 2.
Figure 5:
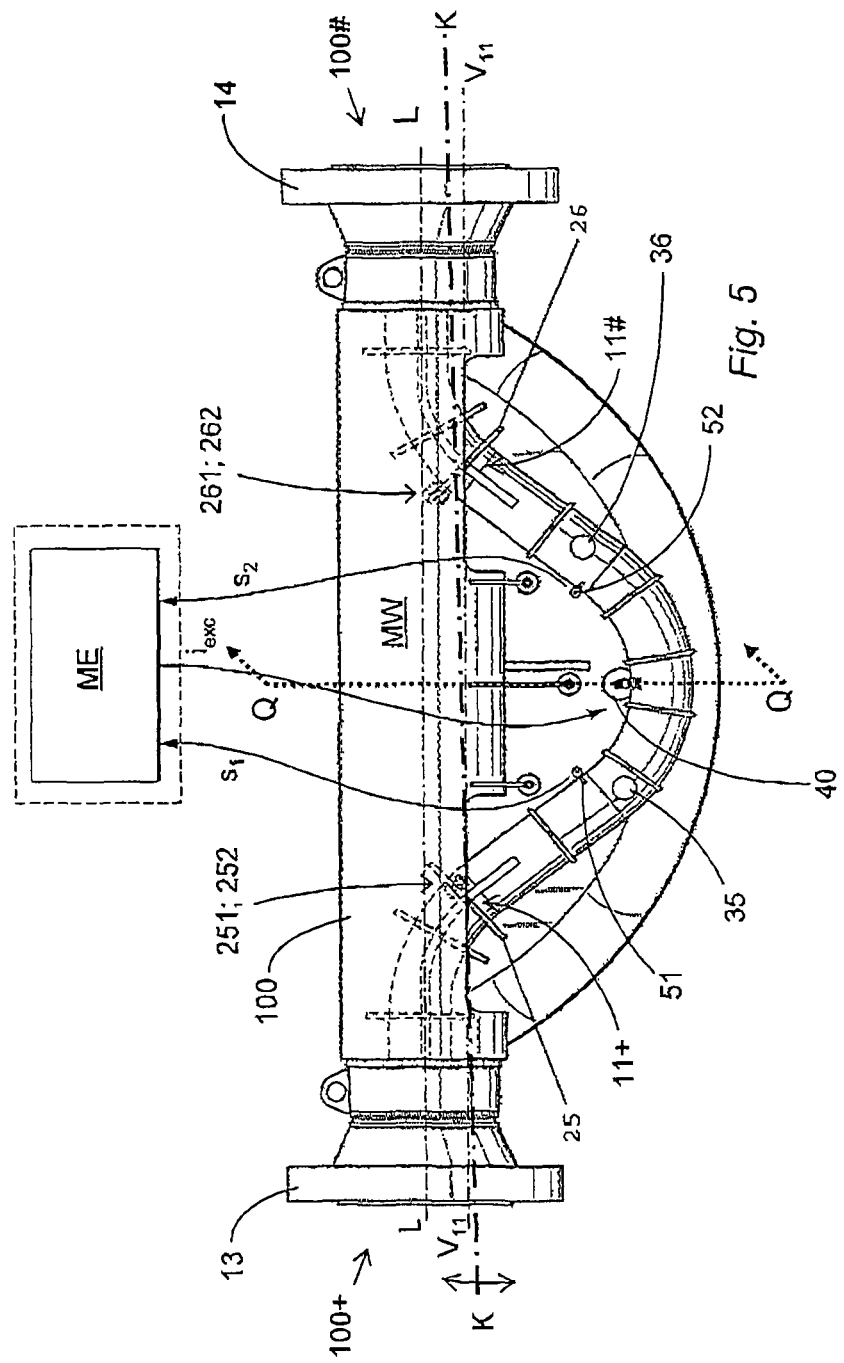

FIGS. 4 and 5 show, furthermore, schematically, an example of an embodiment of a measuring transducer MT suitable for implementing the measuring system. The measuring transducer MT shown here is embodied in the form of a measuring transducer of vibration-type and serves generally for producing in a medium flowing through it, for instance, a medium in the form of a gas and/or a liquid, mechanical reaction forces, e.g. mass flow dependent, Coriolis-forces, density dependent, inertial forces and/or viscosity dependent, frictional forces, which react registerably by sensor and, insofar, also measurably, on the measuring transducer. Based on these reaction forces, e.g. the parameters, mass flow rate m, density ρ and viscosity η of the medium can be measured.

For registering the at least one parameter, the measuring transducer comprises an inner part arranged in a measuring transducer housing 100 and operated during operation of the transmitter electronics ME for effecting the physical to electrical transducing of the at least one parameter to be measured.

For conveying the flowing medium, the inner part shown here, and, insofar, the measuring transducer shown here, includes, according to an embodiment of the invention, furthermore, an inlet-side, first flow divider 21 with at least two mutually spaced, flow openings 21A, 21B serving for dividing inflowing medium into two flow portions, an outlet-side, second flow divider 22 with at least two mutually spaced, flow openings 22A, 22B serving for guiding the flow portions back together, as well as at least two tubes 11, 12 forming a tube arrangement having at least two flow paths connected to the flow dividers 21, 22, especially equally-constructed flow dividers 21, 22, for parallel flow and serving ultimately as measuring tubes, through which medium flows. In such case, a first tube 11 opens with an inlet-side, first tube end into a first flow opening 21A of the first flow divider 21 and with an outlet-side, second tube end into a first flow opening 22A of the second flow divider 22 and a second tube 12 opens with an inlet-side, first tube end into a second flow opening 21B of the first flow divider 21 and with an outlet-side, second tube end into a second flow opening 22B of the second flow divider 202, so that thus the two (measuring-) tubes, insofar, also mechanically coupled with one another, have, in the case of this embodiment of the invention, in the undisturbed operation of the measuring system, medium flowing through them simultaneously and in parallel. The two tubes 11, 12, as well as also the two flow dividers 21, 22, can be produced, for example, from metal, such as e.g. stainless steel, zirconium, tantalum, platinum and/or titanium alloys, and be connected with the flow dividers by material bonding, such as, for instance, by welding or soldering, or also by force interlocking, e.g. friction interlocking, for instance, by roll expansion according to the initially mentioned U.S. Pat. No. 5,610,342. In the example of an embodiment shown here, the flow dividers are, insofar, integral components of the measuring transducer housing, in that the first flow divider forms an inlet-side, first housing end defining the inlet end 100+ of the measuring transducer and the second flow divider forms an outlet-side, second housing end defining the outlet end 100# of the measuring transducer. For the typical case, in which the measuring transducer MT is to be assembled releasably with the process line formed, for example, by a metal pipeline, there are provided on the inlet side of the measuring transducer a first connecting flange 13 for connecting to a line segment of the process line supplying medium to the measuring transducer and on the outlet side a second connecting flange 14 for connecting to a line segment of the process line removing medium from the measuring transducer. The connecting flanges 13, 14 can, in such case, such as quite usual in the case of measuring transducers of the described type, also be welded onto the respective housing ends and, insofar, be terminally integrated into the measuring transducer housing 100.

In the example of an embodiment shown here, furthermore, each of the two tubes 11, 12, extending, in each case, between its inlet-side, first tube end 11+, respectively 12+ and its outlet-side, second tube end 11#, respectively 12# with a—essentially freely oscillating—wanted-oscillatory length, is at least sectionally curved. For producing the aforementioned reaction forces, each of the two tubes is caused during operation to vibrate at least over its oscillatory length, for example, with the same oscillation frequency as the, respectively, other tube, however, opposite-equally thereto, and is, in such case, oscillatingly, repeatedly, elastically deformed about a static resting position. The particular oscillatory length corresponds, in such case, to a length of an imaginary middle-, or also centroidal, axis (imaginary connecting line through the centers of gravity of all cross sectional areas of the respective tube) extending within the lumen—in the case of curved pipe, thus a stretched straight length of the respective tube 11, or 12. According to an additional embodiment of the invention, each of the tubes is caused so to vibrate during operation that it oscillates, especially in a bending oscillation mode, about an oscillation axis, which is parallel to one of the imaginary connecting axes $C_{11}$, respectively $C_{12}$, imaginarily connecting the two respective pipe ends 11+, 11#, or 12+, 12+'.

The tubes oscillating, for example, during operation essentially opposite-equally to one another, are, furthermore, for forming a first coupling zone, mechanically connected with one another on the inlet side by means of a first coupling element 25, for example, a plate-shaped, first coupling element 25, and, for forming a second coupling zone, mechanically connected with one another on the outlet side by means of a second coupling element 26, for example, a plate-shaped, second coupling element 26. Thus, the first coupling zone defines here, in each case,—adjoining on the inlet side of the wanted oscillatory length—an inlet-side, first tube end 11+, 12+ of each of the two tubes 11, 12 and the second coupling zone, in each case, an outlet-side, second tube end 11#, 12# of each of the respective tube 11, 12. Each of the coupling elements 25, 26 can, such as, for example, also the two tubes 11, 12 and such as quite usual in the case of measuring transducers of the type being discussed, be of a metal, such as e.g. steel or stainless steel, and/or of the same material as the two tubes 11, 12, so that, as a result, the coupling element 25, 26, and the tubes 11, 12 can be connected with one another very easily by means of solder/braze connections and/or by means of welded connections.

As evident, furthermore, from the combination of FIGS. 4 and 5, the coupling element 25 is equally spaced from the first housing end of the measuring transducer housing, as the second coupling element 26 is from the second housing end of the measuring transducer housing. Each of the measuring tubes is in the example of an embodiment shown here, furthermore, so formed and arranged in the measuring transducer that the aforementioned connecting axes extend essentially parallel to an imaginary longitudinal axis L of the measuring transducer imaginarily connecting in- and outlet ends of the measuring transducer. Each of the measuring tubes of the measuring transducer, for example, measuring tubes of stainless steel, titanium, tantalum, or zirconium or an alloy thereof, and, insofar, also having an imaginary center line of the respective measuring tube extending within its lumen, can be embodied e.g. essentially U-shaped, trapezoidally shaped, rectangularly shaped or, as well as also shown in FIGS. 4 and 5, essentially V-shaped.

As directly evident from the combination of FIGS. 4 and 5, each of the at least two tubes 11, 12 is here additionally, in each case, so formed and arranged that the aforementioned center line, such as quite usual in the case of measuring transducers of the type being discussed, lies, in each case, in an imaginary tube plane and the aforementioned two connecting axis $C_{11}$, $C_{12}$ extend parallel to one another, and, consequently, perpendicular to an imaginary central plane Q of the tube arrangement, for example, also such that the two imaginary tube planes are parallel to one another.

In an additional embodiment of the invention, the tubes 11, 12 and the two coupling elements 25, 26 are, furthermore, so formed and oriented relative to one another that the two coupling elements 25, 26 are equidistant relative to said central plane Q of the tube arrangement, consequently thus a center of mass M25 of the first coupling element 25 is essentially equally far removed from said central plane as is a center of mass M26 of the second coupling element 26. The frequency adjusting effect of coupling elements of the aforementioned type results, in such case, as is known, from the fact that each of the two coupling elements, in each case, has a bending stiffness also about an imaginary longitudinal axis K of the tube arrangement imaginarily connecting the center of mass M25 of the first coupling element 25 and the center of mass of the second coupling element 26, especially imaginarily intersecting the first coupling element with the same angle of intersection as the second coupling element, which respective bending stiffness, in each case, produces a contribution to a total stiffness co-determining the eigenfrequencies of the tube arrangement, not least of all a total stiffness also dependent on the (individual-) bending stiffnesses of the tubes.

It is to be noted here, furthermore, that, although the measuring transducer in the example of an embodiment shown in FIGS. 4 and 5 has two curved measuring tubes and resembles at least insofar as concerns its mechanical construction, as well as also its principle of action, the measuring transducers proposed in U.S. Pat. No. 6,920,798 or U.S. Pat. No. 5,796,011, or also those offered by the assignee under the designations "PROMASS E" or "PROMASS F", the invention can, of course, also be used with measuring transducers with straight and/or more than two measuring tubes, for example, thus four parallel measuring tubes, for instance, comparable to those shown in the initially mentioned U.S. Pat. No. 5,602,345 or WO-A 96/08697 or, for example, also those measuring transducers available from the assignee under designation "PROMASS M". Additionally, the measuring transducer can, however, also be formed by means of a tube arrangement having only a single measuring tube conveying medium during operation, along with a blind, or also balancing, tube coupled thereto, comparable thus, for instance, to the measuring transducers shown in U.S. Pat. No. 5,531,126 or U.S. Pat. No. 6,666,098 or, for example, also those available from the assignee under designation "PROMASS H".

For active exciting of mechanical oscillations of the at least two tubes, especially also mutually parallel tubes and/or tubes equally-constructed as regards shape and material, especially to one or more of their natural eigenfrequencies dependent on the density of the medium instantaneously guided therein, the measuring transducer is, furthermore, provided with an electromechanical exciter mechanism 40, especially an electrodynamic exciter mechanism, thus one formed by means of coil and plunging armature, thus a solenoid. This serves—operated by an exciter signal, e.g. an exciter signal with a controlled electrical current and/or a controlled voltage, delivered by the driver circuit of the transmitter electronics and, in given cases, correspondingly conditioned in interaction with the measuring- and evaluating circuit, to convert electrical exciter energy, or -power Eexc fed by means of the driver circuit into an exciter force Fexc acting, e.g. with pulse shape or harmonically, on the at least two tubes and deflecting these in the above-described manner. The exciter force Fexc can, such as usual in the case of such measuring transducers, be embodied bidirectionally or unidirectionally and, in manner known to those skilled in the art. be set as regards its amplitude, e.g. by means of an electrical current and/or voltage, control circuit, e.g. by means of a phases-control loop (PLL), and matched as regards its frequency to an instantaneous mechanical eigenfrequency of the tube arrangement. The construction and application of such a phase control loop serving for aligning an exciter frequency, $f_{exc}$, of the exciter signal to the instantaneous eigenfrequency of the desired wanted mode is described at length e.g. in U.S. Pat. No. 4,801,897. Of course, also other driver circuits, known, per se, to those skilled in the art and suitable for tuning the exciter energy Eexc, can be used, for example, according to the initially mentioned U.S. Pat. No. 4,879,911, U.S. Pat. No. 5,009,109, U.S. Pat. No. 5,050,439, or U.S. Pat. No. 6,311, 136. Furthermore, as regards an application of such driver circuits for measuring transducer of vibration-type, reference is made to the transmitter electronics provided with measurement transmitters of the series "PROMASS 83", such as are available from the assignee, for example, in connection with measuring transducers of the series "PROMASS E", "PROMASS F", "PROMASS M", or also "PROMASS H". Their driver circuit is, for example, in each case, so executed that the lateral bending oscillations in the wanted mode are controlled to a constant amplitude, thus also an amplitude largely independent of density, $\rho$.

According to an additional embodiment of the invention, the at least two tubes 11, 12 are actively excited during operation by means of the exciter mechanism at least at times in a wanted mode, in which they execute, especially predominantly or exclusively, bending oscillations about the mentioned imaginary oscillation axis, for example, predominantly with exactly one natural eigenfrequency (resonant frequency) of the tube arrangement, such as, for instance, that which corresponds to a bending oscillation, fundamental mode, in which each of the tubes has within its respective wanted oscillatory length exactly one oscillatory antinode. Especially, it is, in such case, furthermore provided that each of the tubes, such as quite usual in the case of such measuring transducers with curved tubes, is so excited by means of the exciter mechanism to bending oscillations at an exciter frequency $f_{exc}$ that it bends in the wanted mode oscillatingly at least partially according to one of its natural bending oscillation forms about the mentioned imaginary oscillation axis, for instance, in the manner of an unilaterally clamped cantilever. The bending oscillations of the tubes actively excited by means of the exciter mechanism have, in such case, in each case, in the region of the inlet-side coupling zone defining the particular inlet-side tube end an inlet-side oscillation node and in the region of the outlet-side coupling zone defining the particular outlet-side tube end an outlet-side oscillation node, so that thus the respective tubes extend essentially freely oscillatingly with their oscillatory lengths between these two respective oscillation nodes.

As quite usual in the case of measuring transducers having a tube arrangement of the type being discussed, the tubes are, in such case, especially so excited by means of the exciter mechanism acting, for example, differentially between the two tubes that they execute during operation, at least at times and at least partially, opposite-equal bending oscillations around the longitudinal axis L. In other words, the two tubes 11, 12 move then, in each case, in the manner of tuning fork tines oscillating relative to one another. For this case, according to an additional embodiment of the invention, the exciter mechanism is designed to excite, or to maintain, opposite-equal vibrations of the first tube and of the second tube, especially bending oscillations of each of the tubes, about an imaginary oscillation axis imaginarily connecting their respective first tube ends and respective second tube ends. Serving as exciter mechanism 40 can be, in such case, e.g. an exciter mechanism 40 formed in conventional manner by means of, for example, a single electrodynamic oscillation exciter 41 placed centrally, thus in the region of a half oscillatory length, between the at least two tubes and acting differentially on the tubes. The oscillation exciter 41 can, such as indicated in FIG. 4, be formed, for example, by means of a cylindrical exciter coil secured on the first tube and flowed through during operation by a corresponding exciter current and, associated therewith, permeated by a corresponding magnetic field, as well as a permanently magnetic armature at least partially plunging into the exciter coil and affixed externally, especially centrally, on the second tube. Other exciter mechanisms also quite suitable for the measuring system of the invention for producing oscillations of the at least two tube are shown e.g. in the initially mentioned U.S. Pat. No. 4,680,974, U.S. Pat. No. 4,738,144, U.S. Pat. No. 4,768,384, U.S. Pat. No. 4,801,897, U.S. Pat. No. 4,823,614, U.S. Pat. No. 4,879,911, U.S. Pat. No. 5,009,109, U.S. Pat. No. 5,050, 439, U.S. Pat. No. 5,359,881, U.S. Pat. No. 5,602,345, U.S. Pat. No. 5,734,112, U.S. Pat. No. 5,796,011, U.S. Pat. No. 5,926,096, U.S. Pat. No. 5,969,264, U.S. Pat. No. 6,092,429, U.S. Pat. No. 6,311,136, U.S. Pat. No. 6,883,387, U.S. Pat. No. 7,127,952, U.S. Pat. No. 7,325,461, U.S. Pat. No. 7,392, 709, or U.S. Pat. No. 7,421,350.

For causing the at least two tubes of the measuring transducer to vibrate, the exciter mechanism 40 is, such as already mentioned, fed by means of a likewise oscillating, exciter signal of adjustable exciter frequency $f_{exc}$, so that the exciter current $i_{exc}$, correspondingly controlled in its amplitude, flows during operation through the exciter coil of the, here single, oscillation exciter acting on the tube 10, whereby a required magnetic field is produced for moving the tubes. The driver- or also exciter, signal, respectively its exciter current $i_{exc}$, can be e.g. harmonic, multifrequent or even rectangularly shaped. The exciter frequency $f_{exc}$ of the exciter current required for maintaining the actively excited vibrations of the tubes can, in the case of the measuring transducer shown in the example of an embodiment, in advantageous manner, be so selected and set that the tubes, such as already mentioned, oscillate predominantly in a bending oscillation, fundamental mode.

For the operationally provided case, in which medium is flowing in the process line and, thus, the mass flow m in the tube arrangement is different from zero, also Coriolis forces are induced in the medium flowing through the tubes when the tubes vibrate in above described manner. These, in turn, react on the respective tube, through which medium is flowing, and so bring about an additional, sensorially registrable deformation of the same, and, indeed, essentially according to an additional, natural eigenoscillation form of higher modal order than the wanted mode. An instantaneous embodiment of this so-called Coriolis mode superimposed on the excited, wanted mode with equal frequency is, in such case, dependent, especially as regards its amplitude, also on the instantaneous mass flow m. Serving as Coriolis mode can be, such as usual in the case of measuring transducers with curved tubes, e.g. the eigenoscillation form of the anti-symmetric twist mode, thus that, in the case of which the respectively flowed through tube, such as already mentioned, also executes rotary oscillations about an imaginary rotary oscillation axis directed perpendicular to the bending oscillation axis and imaginarily intersecting the center line of the respective tube in the region of its half oscillatory length.

For registering vibrations of the tubes, especially also oscillations in the Coriolis mode, the measuring transducer includes, furthermore, a corresponding sensor arrangement 50. This comprises, as schematically indicated in FIGS. 4 and 5, at least a first oscillation sensor 51, for example, an electrodynamic, first oscillation sensor 51 and/or a first oscillation sensor 51 spaced from the at least one oscillation exciter and arranged between the at least two tubes 11, 12 for delivering a first vibration measurement signal $s_1$ of the measuring transducer, for example, a voltage corresponding to the oscillations or an electrical current corresponding to the oscillations, representing vibrations of at least one of the two tubes, for example, also opposite-equal vibrations of the at least two tubes. Furthermore, according to a further development of the invention, it is provided that the sensor arrangement has at least a second oscillation sensor 52, for example, spaced from the first oscillation sensor 51 and arranged between the at least two tubes 11, 12 and/or an electrodynamic, second oscillation sensor 52, for delivering a second vibration measurement signal $s_2$ of the measuring transducer representing vibrations of at least one of the two tubes, for example, also opposite-equal vibrations of the at least two tubes. The oscillation sensors of the sensor arrangement can, in advantageous manner, additionally be so embodied that it delivers a vibration measurement signal of the same type, for example, in each case, a signal voltage, respectively a signal current. In the example of an embodiment shown here, the first oscillation sensor 51 is arranged on the inlet side and the second oscillation sensor 52 is arranged on the outlet side, each between the at least two tubes 11, 12, especially equally spaced from the at least one oscillation exciter, respectively from the center of the tube 11, 12, respectively in such a manner that opposite-equal vibrations of the two tubes are differentially registered. The oscillation sensors of the sensor arrangement can, for example, however, also be so embodied and arranged in the measuring transducer that they, such as, among other things, also provided in U.S. Pat. No. 5,602,345, register the oscillations relative to the measuring transducer housing.

Each of the—typically broadband—vibration signals $s_1$, $s_2$ of the measuring transducer MT includes, in such case, in each case, a signal component corresponding to the wanted mode with a signal frequency corresponding to the instantaneous oscillation frequency $f_{exc}$ of the tubes oscillating in the actively excited, wanted mode and, dependent on the current mass flow of the medium flowing in the tube arrangement, a phase shift relative to the exciter signal $i_{exc}$, for example, an exciter signal $i_{exc}$ generated by means of a PLL circuit as a function of a phase difference existing between at least one of the vibration signals $s_1$, $s_2$ and the exciter current in the exciter mechanism. Even in the case of application of a rather broadband exciter signal $i_{exc}$, it can as a result of the most often very high oscillation quality factor of the measuring transducer MT be assumed that the signal component of each of the vibration signals corresponding with the wanted mode outweights other signal components, especially signal components corresponding to possible external disturbances and/or which can be classified as noise, and is, insofar, also dominating, at least within a frequency range corresponding to a bandwidth of the wanted mode.

The vibration measurement signals $s_1$, $s_2$ delivered by the measuring transducer, which have, in each case, a signal component with a signal frequency corresponding to an instantaneous oscillation frequency $f_{exc}$ of the at least two tubes oscillating in the actively excited, wanted mode, are, as shown in FIG. 3, fed to the transmitter electronics ME and there then to the therein provided, measuring- and evaluating circuit μC, where they are, first of all, preprocessed by means of a corresponding input circuit IN, especially preamplified, filtered and digitized, in order then to be able to be suitably evaluated. Applied as input circuit IN and as measuring- and evaluating circuit μC can be, in such case, circuit technologies, for example, also such according to the initially mentioned state of the art, already applied and established in conventional Coriolis, mass flow, measuring devices for the purpose of converting the vibration signals, respectively ascertaining mass flow rates and/or totalled mass flows, etc. According to an additional embodiment of the invention, the measuring- and evaluating circuit μC is accordingly also provided by means of a microcomputer implemented in the transmitter electronics ME, for example, by means of a digital signal processor (DSP), along with program-code correspondingly implemented and executed therein. The program-code can be stored persistently e.g., in a non-volatile, data memory EEPROM of the microcomputer and, in the case of the running of the same, be loaded into a volatile, data memory RAM, e.g. integrated in the microcomputer. Suitable processors for such applications include e.g. those of type TMS320VC33, such as are available from the firm, Texas Instruments Inc. Of course, the vibration signals $s_1$, $s_2$ are, such as already indicated, converted into corresponding digital signals by means of corresponding analog to digital converters A/D of the transmitter electronics ME, in order that they can be processed in the microcomputer; compare, in this connection, for example, the initially mentioned U.S. Pat. No. 6,311,136 or U.S. Pat. No. 6,073,495 or also the aforementioned measurement transmitters of the series "PROMASS 83".

The transmitter electronics ME, respectively the therein contained measuring and evaluating circuit μC, serves, in such case, according to an additional embodiment of the invention, with application of the vibration measurement signals $s_1$, $s_2$ delivered by the sensor arrangement 50, for example, based on a phase difference detected between the vibration signals $s_1$, $s_2$ of the first and second oscillation sensor 51, 52 generated in the case of tube 11, oscillating partially in the wanted mode and partially in the Coriolis mode, recurringly to ascertain a mass flow, measured value $X_m$, which represents a mass flow rate of the medium flowing in the measuring transducer. For such purpose, the transmitter electronics, according to an additional embodiment of the invention, produces during operation recurringly a phase difference, measured value $X_{\Delta\phi}$, which represents instantaneously the phase difference $\Delta\phi$ existing between the first vibration-signal $s_1$ and the second vibration-signal $s_2$. Alternatively or supplementally, for ascertaining the mass flow, measured value $X_m$, the transmitter electronics ME of the measuring system can also serve to produce, derived from an instantaneous oscillation frequency, especially that of the actively excited, wanted mode, based on the vibration measurement signals or ascertained from the exciter signal, a density, measured value, which represents a density of the medium flowing in the measuring transducer. Furthermore, the transmitter electronics ME can, such as quite usual in the case of in-line measuring devices of the type being discussed, in given cases, also be used to ascertain a viscosity, measured value $X_\eta$ representing a viscosity of the medium flowing in the measuring transducer; compare, in this connection, also the initially mentioned U.S. Pat. No. 7,284,449, U.S. Pat. No. 7,017,424, U.S. Pat. No. 6,910,366, U.S. Pat. No. 6,840,109, U.S. Pat. No. 5,576,500 or U.S. Pat. No. 6,651,513. Suited for ascertaining the exciter energy or excitation power, or attenuation, required for determining the viscosity is, in such case, for example, the exciter signal delivered by driver circuit of the transmitter electronics, especially an amplitude and frequency of its electrical current component driving the wanted mode or also an amplitude of the total exciter current, in given cases, also normalized on an oscillation amplitude ascertained based on at least one of the vibration signals. Alternatively thereto or in supplementation thereof, however, also an internal control signal serving for tuning the driver signal, respectively the exciter current, or, for example, in the case of an exciting of the vibrations of the at least one tube with an exciter current of fixedly predetermined amplitude, or amplitude controlled to be constant, also at least one of the vibration signals, especially an amplitude thereof, can serve as a measure of the exciter energy or excitation power, or attenuation required for ascertaining the viscosity, measured value.

As already mentioned, it is, in the case of tube arrangements of the type being discussed, consequently also in the case of measuring transducers of vibration-type formed therewith, especially necessary to be able to trim one or more of their eigenfrequencies—not least of all also the eigenfrequency of the eigenmode provided for the mentioned wanted mode —, in each case, as exactly as possible to a target eigenfrequency predetermined for the respective eigenmode under defined reference conditions. Serving as reference, in such case, can be, for example, a tube arrangement open to the atmosphere, consequently only conveying air, at room temperature, for example, thus, for instance, 20° C., thus the target eigenfrequencies correspondingly ascertained for such a tube arrangement earlier. Moreover, it is also of considerable interest in the case of tube arrangements of the type being discussed to prevent, respectively to compensate, asymmetries of mass- and/or of stiffness distributions within the tube arrangement, which lead to, or favor, undesired formation of asymmetric oscillation modes, for instance, in the manner of the Coriolis mode, even in the case of a tube arrangement, through which medium is not flowing. The method of the invention aims thus to increase the precision, with which such an adjustment of a tube arrangement formed by means of one or more tubes, especially by means of one or more measuring tubes (respectively, also, in given cases, blind- or balancing tubes) is performed as regards at least one target eigenfrequency, and to make said adjustment as simple as possible.

Figure 6:
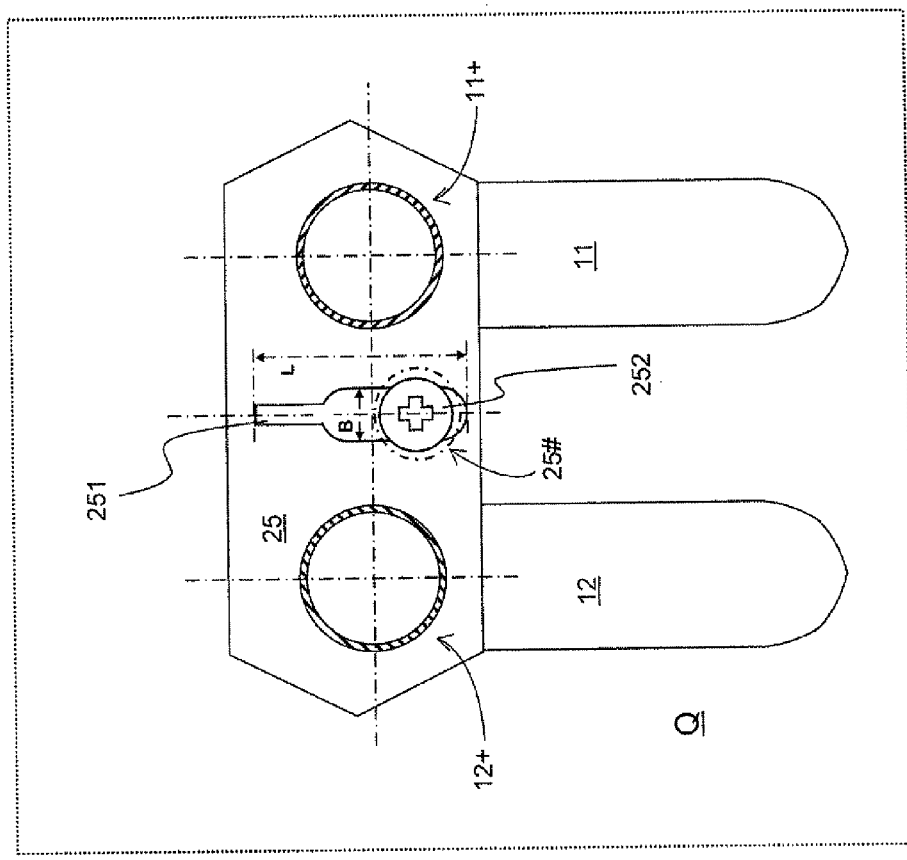
FIG. 6 is a section of a tube arrangement with a coupling element affixed to two tubes, especially a tube arrangement suitable for a measuring transducer according to FIGS. 4, 5.

In the case of the measuring transducer of the invention, it is, consequently, provided, as presented schematically in FIG. 6, that at least one of the two coupling elements 25, 26—here namely the first coupling element 25—has in a region extending between the first and second tubes 11, 12 a slit 251 having at least one closed end, a maximal slit width W and a maximal slit length L, which is greater than the maximal slit width W. Slit 251, for example embodied as an elongated hole or as a unilaterally open, straight, elongated slot, extends in the example of an embodiment shown here over its entire length L along an imaginary center line of the coupling element 25. Furthermore, said coupling element 25 includes, partially placed within the slit 251, a connecting element 252, which contacts a slit edge enclosing said slit 251 and consequently defining a contour of the slit 251.

The connecting element 252, embodied, for example, to be very bending-resistant, is affixed to edge regions 251', 251" of the slit 251 lying opposite one another and, in each case, spaced from the closed end, whereby said edge regions 251', 251" lying opposite one another are mechanically coupled with one another by means of the connecting element 252 to form a securement zone 25#, within which relative movements of said edge regions 251', 251" are prevented. As a function of a position selected for connecting element 252, a position lastly also defined by the distance of the connecting element 252 from the closed end of the slit 251, a bending stiffness is established characteristic for the coupling element 25 and co-determining an eigenfrequency of the tube arrangement. Associated with this, thus, also said eigenfrequency can be tuned. The securement zone 25# can be formed in very simple manner, e.g. by clamping the oppositely lying edge regions of the slit edges in the connecting element. The securement zone 254 can additionally be formed by affixing the connecting element 252 releasably on the oppositely lying edge regions 251', 251" of the slit edges.

Figure 7A:
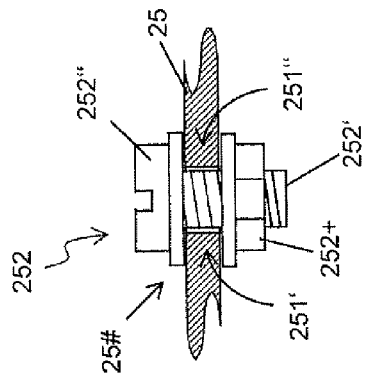
FIG. 7a and FIG. 7b are sections of variants of a coupling element suitable for a tube arrangement according to FIG. 6.
Figure 7B:
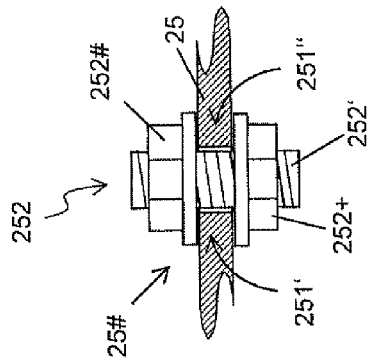

In an additional embodiment of the invention, the connecting element 252 is, such as evident from the combination of FIGS. 6 and 7a, or 7b, formed by means of at least one screw 252' having an externally threaded screw shaft placed partially in the slit 251, for example, a screw embodied in the form of a cap screw or a stud bolt, as well as by means of at least one nut 252+ having an internal thread in engagement with the external thread of the screw shaft. The at least one nut 252+ can be, for example, a self-securing nut.

The external thread of the screw 252', consequently the internal thread of the at least one nut 252+, are, in such case, embodied as regards their respective thread pitch in advantageous manner such that, as a result, a self-locking screwed connection is formed. For the purpose of increasing assurance against undesired self-releasing of the so formed screwed connection, the at least one nut 252' of the connecting element 252 can be embodied, for example, as a toothed nut, or, for example, also as a locking nut, having teeth with asymmetric tooth flanks on the side facing the edge regions 251', 251". Alternatively or in supplementation, the at least one nut 252+ of the connecting element 252 can be secured by means of a counter nut against undesired self-releasing.

In an additional embodiment of the invention, the at least one screw 252' of the connecting element is embodied as a cap screw, namely as a screw, which has a screw head 252" on an end of the screw shaft. As presented schematically in FIG. 7a, the securement zone 25# can be formed using said screw in very simple manner by clamping each of the oppositely lying, edge regions 251', 251" of the slit edges ultimately forming the securement zone 25#, in each case, between screw head and nut, for example, in each case, in direct contact with screw head and nut, or, however, also, such as presented schematically in FIG. 7a, with interposed ply of at least one washer correspondingly contacting the edge regions. For the purpose of increasing the safety against undesired self-releasing of the so formed, screwed connection, the screw 252' of the connecting element can, for example, also be embodied as a toothed flange bolt, which has on the underside of the bolt head facing the edge regions teeth with asymmetrically toothed flanks.

Another embodiment of the connecting element 252, respectively the therewith formed securement zone 25#, of the coupling element 25 is shown in FIG. 7b. In such case, the connecting element 252 includes supplementally to the already mentioned nut 252+, another—second—nut 252#, which, such as the other—first—nut 252+, is engaged via a corresponding internal thread with the external thread on the screw shaft of the screw—here, for example, in the form of a stud bolt. In this case, each of the oppositely lying edge regions 251', 252" of the slit edges within the securement zone is, in each case, clamped between two nuts, for example, with an intermediate ply of at least one washer contacting the edge regions. The two nuts 252+, 252# can, however, also, in each case, be in direct contact with the edge regions. Especially, the connecting element 252 is, both for the embodiment shown in FIG. 7a as well as also for that in FIG. 7b, furthermore, affixed, or the securement zone 25# is, in each case, formed, by turning said screw 252' and said at least one nut 252" relative to one another about an imaginary screw axis until, as a result of a lessening of a relative separation between the nut and its respective counterpart, thus the screw head, or the other nut, ultimately the edge regions 251', 252" are compressed and the screw 252' correspondingly strained, in given cases, also along with slight plastic deformation of the so clamped edge regions 251', 251" of the slit 251.

The final position of the connecting element 252 within the slit 251, consequently also the position of the so formed securement zone 25#, or its separation for the closed end of the slit, are, in the case of the measuring transducer of the invention, furthermore, so selected that, as a result, ultimately the desired target eigenfrequency of the tube arrangement is set. The securement zone 25# can e.g. also be formed after the tube arrangement has been manufactured, at least to the extent that the at least two tubes are connected by means of the at least two coupling elements.

For finding the position within the slit 251 actually required for connecting element 252 for obtaining the desired target eigenfrequency, the connecting element 252 can, after it has been placed within the slit 251 of the coupling element 25 affixed to the tubes 11, 12, be affixed there, for example, temporarily, in a position, which, for instance, based on knowledge acquired from earlier performed, comparative measurements on same-type tube arrangements, or measuring transducers formed therewith, corresponds about, in given cases, however, yet not exactly, to the position corresponding to the ultimately desired, target eigenfrequency. As a result of this, thus the tube arrangement can during the manufacturing process, have, initially, an interim eigenfrequency, namely an eigenfrequency only interimly characteristic for the tube arrangement and still deviating from the desired target eigenfrequency. After the connecting element 252 has been correspondingly positioned and affixed, it can, furthermore, be checked whether the tube arrangement is already trimmed to the predetermined, target eigenfrequency, or it can be ascertained that momentarily only an interim eigenfrequency is set, respectively to what extent the presently set, interim eigenfrequency deviates from the target eigenfrequency actually desired for the tube arrangement.

The so actually set eigenfrequency of the tube arrangement can, for example, very simply and to a good approximation, be ascertained by causing—e.g. by introducing a corresponding exciter force via exciter mechanism—at least one of the tubes, or the entire tube arrangement formed therewith, to vibrate at said instantaneous eigenfrequency in a natural eigenmode corresponding thereto and ascertaining, based on a corresponding frequency measurement, any discrepancy between this instantaneous eigenfrequency and the earlier determined, or expected, target eigenfrequency for said eigenmode.

Accordingly, in an additional embodiment of the invention, it is, furthermore, provided for ascertaining the interim eigenfrequency that at least one of the tubes is caused to vibrate, respectively said vibrations of such at least one of the tubes is correspondingly registered and evaluated as regards the oscillation frequency. Derived from the aforementioned frequency measurement, for instance, by exploiting the typically sufficiently known functional dependence for the tube arrangement for mechanical eigenfrequencies characteristic for the tube arrangement on the instantaneous bending stiffness of the respective coupling element as well as on the mass and mass distribution of the tube arrangement, the volume portion still correspondingly to be removed for the desired eigenfrequency, respectively the accordingly desired bending stiffness of the coupling element, can be sufficiently ascertained right after installation of the provided tube arrangement, respectively after manufacture of the inner part.

For introducing via exciter mechanism 40 exciter forces for the purpose of causing the tube to vibrate for the frequency measurement, as well as also for detecting therefrom resulting vibrations of the tube, or for the purpose of displaying measured eigenfrequencies, in the case of readied inner part, for example, the transmitter electronics already intended for the measuring system ultimately to be manufactured can be used. Alternatively or supplementally, however, also a comparable test-electronics remaining at the manufacturing plant can be used.

For the not completely to be excluded case, in which a too high deviation of the momentarily set eigenfrequency from the desired target eigenfrequency is detected, the connecting element 252 can then, first of all, be released to the extent that it is thereafter movable relative to the slit 251, in order then to be correspondingly newly positioned, namely into such a region of the slit 251, which, based on the earlier performed frequency measurement, now seems more suitable for forming the securement zone 254 to obtain the target eigenfrequency. Then, the connecting element 252 is retightened. An advantage of the invention is, thus, among other things, also that the aforementioned sequence of releasing, new positioning and resecuring of the connecting element 252 can be repeated as often as necessary, until a corresponding review—in given cases, also repeatedly performed—shows that the then set eigenfrequency corresponds sufficiently exactly to the target eigenfrequency predetermined for the tube arrangement. Thus, the target eigenfrequency can also be detected and set iteratively using a "trial & error" method.

A further advantage of the invention, is that, along with the targeted tuning of the target eigenfrequency, additionally also imbalances possibly occurring in the tube arrangement after its assembly, or even after its installation in the measuring transducer housing —, first of all, of course, still accessible in sufficient measure—, for instance, imbalances occurring as a result of tolerances of the individual components, can be reduced to a predetermined degree. Another advantage is that the tube arrangement, respectively the bending stiffnesses of the two coupler elements, can so be matched also very simply according to the initially mentioned international application PCT/EP 2012/056102, namely in cases where the bending stiffness of the coupler element 25 around the mentioned imaginary longitudinal axis K of the tube arrangement deviates from the corresponding bending stiffness of the coupling element 26 around said longitudinal axis K, respectively the imaginary longitudinal axis K of the tube arrangement, as well as also presented schematically in FIG. 5, is not parallel to the mentioned connecting axis $C_{11}$, respectively $C_{12}$.

Furthermore, not least of all for the case, in which the tube arrangement is formed by means of exactly two parallel U-, V-, rectangularly or trapezoidally curved tubes, suitable earlier choice of the target eigenfrequency, along with a correspondingly precise tuning of the same in the above-described manner, for the particular tube arrangement, also the transverse forces mentioned in the above cited U.S. Pat. No. 7,350,421, U.S. Pat. No. 7,562,585 or EP-A 1 248 084 acting essentially perpendicularly to the imaginary longitudinal axis L can in very simple and effective manner be significantly minimized.

In an additional embodiment, such as schematically shown in FIG. 5, also the second coupling element 26 includes in a region extending between the first and second tubes 11, 12, in turn, a slit 261 having at least one closed end, for example, a slit 261 identical to the slit of the first coupling element 25, as well as, in turn, a connecting element 262 placed partly within said slit 261, for example, also a connecting element 262 constructed equally to the connecting element of the first coupling element, wherein said connecting element, in turn, contacts a slit edge enclosing the slit of the coupling element 26 to form a corresponding securement zone of the coupling element 26, within which, in turn, relative movements of said edge regions of the slit are prevented. The two coupling elements 25, 26 can, in such case, in given cases, have different positions of the respective securement zones, respectively different distances of the connecting elements of the coupling elements from the respective closed end of the associated slit. They can otherwise, however, be embodied to have equal construction. By forming a securement zone of the type being discussed also within the second coupler element 26, for example, the mentioned transverse forces, respectively asymmetries, can also be largely minimized, independently of the target eigenfrequency to be set by means of the two coupler elements 25, 26.

Although the invention has above only been explained with reference to one, respectively two, coupling element(s), it is to be noted here that, of course, not least of all also for the purpose of additionally improving the precision, with which, for example, the target eigenfrequency can be set, and/or for the purpose of creating the opportunity of being able to trim selectively the eigenfrequencies for different eigenmodes, for instance, that corresponding to the wanted mode, or that corresponding to the Coriolis mode, and/or for the purpose of additional minimizing of transverse forces acting perpendicularly to the imaginary longitudinal axis L, also other coupling elements of the type being discussed possibly provided on the tube arrangement can have the slits and therewith be provided with securement zones manufactured in the above-described manner. Moreover, in case required, supplementally also discrete supplemental masses 35, 36 can be placed on the tubes 11, respectively 12, which on their part likewise provide a contribution, for instance, also a mode-selective contribution, lowering eigenfrequencies of the tube arrangement.

The invention claimed is:

1. A measuring transducer of vibration-type for producing vibration signals as a function of parameters of a flowing medium, said measuring transducer comprising:
   a measuring transducer housing with a first housing end and a second housing end; and
   a tube arrangement extending within said measuring transducer housing from said first housing end to said second housing end, and formed by means of at least two tubes, of which at least a first tube, is embodied as a measuring tube serving for conveying flowing medium, and
   of which a second tube is connected mechanically with said first tube to form an inlet-side, first coupling zone by means of a first coupling element, and to form an outlet-side, second coupling zone by means of a second coupling element, wherein:
   in a region extending between said first and second tubes said first coupling element exhibits a slit with a maximal slit width and a maximal slit length, which is greater than the maximal slit width, and said first coupling element includes a connecting element, which is placed partially within said slit,
   said slit exhibiting at least one closed end,
   and said connecting element contacting a slit edge enclosing said slit, in order to form a securement zone, within which relative movements of said edge regions are prevented, in that said connecting element is affixed to said edge regions lying opposite one another.

2. The measuring transducer as claimed in claim 1, wherein:
   edge regions of the slit edges of said slit lying opposite one another and spaced from the at least one closed end of said slit are mechanically coupled with one another by means of said connecting element, in order to form a securement zone of said first coupling element, within which relative movements of said edge regions are prevented.

3. The measuring transducer as claimed in claim 2, wherein:
   said securement zone is formed, in that said connecting element is affixed to the opposite lying edge regions of the slit edges.

4. The measuring transducer as claimed in claim 2, wherein:
   said securement zone is formed by clamping the mutually opposing edge regions of the slit edges in said connecting element.

5. The measuring transducer as claimed in claim 1, wherein:
   said connecting element comprises at least one screw placed partially in said slit, said at least one screw including a screw shaft with an external thread, and said connecting element comprises at least one nut with an internal thread, said internal thread engaging said external thread of said at least one screw.

6. The measuring transducer as claimed in claim 5, wherein:
   said screw of said connecting element includes a screw head on an end of the screw shaft; and
   each of the oppositely lying edge regions of the slit edges within said securement zone is, in each case, clamped between said screw head and said nut.

7. The measuring transducer as claimed in claim 6, wherein:
   each of the oppositely lying edge regions of the slit edges within said securement zone is, in each case, clamped between said screw head and said nut with interpositioning of an intermediate ply in the form of at least one washer contacting the edge regions.

8. The measuring transducer as claimed in claim 5, wherein:
   said screw of said connecting element is embodied as a toothed flange bolt.

9. The measuring transducer as claimed in claim 5, wherein:
   the at least one nut of said connecting element is embodied as a toothed nut.

10. The measuring transducer as claimed in claim 5, wherein:
    the at least one nut of said connecting element is embodied as a locking nut.

11. The measuring transducer as claimed in claim 5, wherein:
said connecting element further comprises at least one counter nut securing the nut.

12. The measuring transducer as claimed in claim 5, wherein: the at least one screw of said connecting element is a cap screw.

13. The measuring transducer as claimed in claim 5, wherein: the at least one screw of said connecting element is a stud bolt.

14. The measuring transducer as claimed in claim 5, wherein the at least one nut of said at least one screw contacts each of the two edge regions of said slit.

15. The measuring transducer as claimed in claim 5, wherein the at least one nut of said at least one screw is a self-securing nut.

16. The measuring transducer as claimed in claim 1, wherein:
said connecting element comprises at least one screw placed partially in said slit, said at least one screw including a screw shaft with an external thread, and
said connecting element comprises a first nut with an internal thread, said internal thread of the first nut engaging said external thread of said at least one screw, and a second nut the second nut with an internal thread, said internal thread of the second nut engaging the external thread of said at least one screw; and
each of the oppositely lying edge regions of the slit edges within said securement zone is, in each case, clamped between nuts.

17. The measuring transducer as claimed in claim 16, wherein:
the second nut of said connecting element contacts each of the two edge regions of the slit.

18. The measuring transducer as claimed in claim 17, wherein:
each of the oppositely lying edge regions of the slit edges within said securement zone is, in each case, clamped between said first and second nuts with interpositioning of an intermediate ply in the form of at least one washer contacting the edge regions.

19. The measuring transducer as claimed in claim 1, wherein;
said first coupling element is arranged equally far from the first housing end of the measuring transducer housing as said second coupling element is from the second housing end of the measuring transducer housing.

20. The measuring transducer as claimed in claim 1, further comprising:
an electromechanical exciter mechanism mechanically coupled with the tube arrangement, for effecting vibrations, of the at least two tubes.

21. The measuring transducer as claimed in claim 1, further comprising:
a sensor arrangement for registering vibrations, of at least one of the tubes and for producing at least one vibration signal representing said vibrations.

22. The measuring transducer as claimed in claim 1, wherein:
said first tube extends parallel to said second tube; and/or said first tube and said second tube are of equal construction as regards shape and material.

23. The measuring transducer as claimed in claim 1, wherein:
each of said tubes is curved.

24. The measuring transducer as claimed in claim 23, wherein:
each of said tubes is U shaped.

25. The measuring transducer as claimed in claim 23, wherein:
each of said tubes is V shaped.

26. The measuring transducer as claimed in claim 1, wherein:
said second tube is also embodied as a measuring tube serving for conveying flowing medium.

27. The measuring transducer as claimed in claim 1, further comprising:
an inlet-side, first flow divider having at least two mutually spaced flow openings; and
an outlet-side, second flow divider having at least two mutually spaced flow openings, wherein:
the at least two tubes are connected with said flow dividers, to form a tube arrangement with at least two flow paths, along which flow can occur in parallel,
said at least two tubes being connected with said flow dividers in such a manner that
said first tube opens with an inlet-side, first tube end into a first flow opening of said first flow divider and with an outlet-side, second tube end into a first flow opening of said second flow divider and that
said second tube opens with an inlet-side, first tube end into a second flow opening of said first flow divider and with an outlet-side, second tube end into a second flow opening of said second flow divider.

28. The measuring transducer as claimed in claim 27, wherein:
the first housing end of the measuring transducer housing is formed by means of said first flow divider and the second housing end of the measuring transducer housing by means of said second flow divider.

29. The measuring transducer as claimed in claim 1, wherein:
in a region extending between said first and said second tubes, said second coupling element exhibiting a slit
and said second coupling element including a connecting element, which is placed partially within the slit, said slit exhibiting at least one closed end, and
said connecting element contacting a slit edge enclosing said slit, in order to form a securement zone, within which relative movements of said edge regions are prevented.

30. The measuring system for a medium flowing in a pipeline, especially an aqueous liquid, a slurry, a paste or some other flowable material, which measuring system, especially a measuring system embodied as a compact measuring device and/or as a Coriolis, mass flow, measuring device, comprises:
a measuring transducer as claimed in claim 1, through which medium flows during operation, as well as a transmitter electronics electrically coupled with the measuring transducer for activating the measuring transducer and for evaluating vibration signals delivered by the measuring transducer.

31. The measuring transducer as claimed in claim 1, wherein each of said tubes is straight.

32. The measuring transducer as claimed in claim 1, wherein the slit is embodied as an elongated hole.

33. The measuring transducer as claimed in claim 1, wherein the slit is embodied as a unilaterally open, straight, elongated slot.

34. A method for tuning at least one eigen-frequency characteristic for a tube arrangement formed by means of at least two tubes, of which two tubes at least a first tube, is embodied as a measuring tube serving for conveying flowing medium, and of which two tubes a second tube is connected mechanically with said first tube by means of a first coupling element to form an inlet-side, first coupling zone and by means of a second coupling element to form an outlet-side, second coupling zone, wherein:

in a region extending between said first and said second tubes said first coupling element, exhibits a slit with a maximal slit width and a maximal slit length, which is greater than the maximal slit width, said slit exhibiting at least one closed end, said method comprising:

affixing a connecting element placed partially within the slit, in such a manner that the connecting element, contacts a slit edge enclosing the slit and that the connecting element mechanically couples edge regions of the slit edges lying opposite one another, in order to form a securement zone, within which relative movements of said edge regions are prevented.

35. The method as claimed in claim 34, further comprising:
ascertaining an interim eigenfrequency of the tube arrangement, namely an eigenfrequency differing from a target eigenfrequency predetermined for the tube arrangement, and to which the tube arrangement is to be tuned, respectively.

36. The method as claimed in claim 34, further comprising:
ascertaining to what extent the interim eigenfrequency of the tube arrangement deviates from the target eigenfrequency.

37. The method as claimed in claim 34, further comprising:
positioning the connecting element in a region of the slit suitable for forming a securement zone establishing the target eigenfrequency.

38. The method as claimed in claim 34, further comprising:
releasing the connecting element in such a manner that said connecting element is thereafter movable relative to the slit.

39. The method as claimed in claim 34, further comprising:
testing whether the tube arrangement is trimmed to a target eigenfrequency predetermined therefor.

40. The method as claimed in claim 34, further comprising:
letting at least one of the tubes vibrate for ascertaining the interim eigenfrequency.

41. The method as claimed in claim 34, wherein:
the connecting element comprises at least one screw with a screw shaft exhibiting an external thread, said at least one screw being placed partially in the slit, and the connecting element comprises at least one nut, with an internal thread engaging said external thread, in the case of which method said screw and the at least one nut are rotated relative to one another about an imaginary screw axis for affixing the connecting element.

42. The method as claimed in claim 41, wherein:
the screw of the connecting element exhibits on an end of the screw shaft a screw head, in the case of which method, for forming the securement zone, each of the oppositely lying edge regions of the slit edges within the securement zone is, in each case, clamped between screw head and nut.

43. The method as claimed in claim 41, wherein:
the connecting element comprises at least two nuts, of which each has an internal thread engaging the external thread of the screw shaft, in the case of which method, for forming the securement zone, each of the oppositely lying edge regions of the slit edges within the securement zone is, in each case, clamped between both nuts.

44. The method as claimed in claim 34, further comprising:
ascertaining, based on at least one measured mechanical instantaneous eigenfrequency of the tube arrangement in the case of tube allowed vibrate, to what extent the interim eigenfrequency of the tube arrangement deviates from the target eigenfrequency.

45. The method as claimed in claim 34, further comprising:
testing, based on at least one instantaneous mechanical eigenfrequency of the tube arrangement measured in the case of a tube allowed vibrate, whether the tube arrangement is trimmed to a target eigenfrequency predetermined therefor.

* * * * *